United States Patent [19]

Bennett et al.

[11] Patent Number: 4,506,346
[45] Date of Patent: Mar. 19, 1985

[54] PROGRAMMABLE CARTRIDGE TELEPHONE COMMUNICATION SYSTEM

[75] Inventors: Joseph M. Bennett, Middletown; Alan M. Gordon, Matawan; Vincent J. Silverio, Middletown; Herbert M. Zydney, Rumson, all of N.J.

[73] Assignee: AT&T Bell Laboratories, Murray Hill, N.J.

[21] Appl. No.: 445,982

[22] Filed: Dec. 1, 1982

[51] Int. Cl.³ .............................................. G06F 1/00
[52] U.S. Cl. .............................. 364/900; 179/18 ES
[58] Field of Search ..................... 364/900 MS File; 179/18 B, 18 ES, 99 M, 99 R

[56] References Cited

U.S. PATENT DOCUMENTS

| Re. 30,671 | 7/1981 | Poland | 364/706 |
|---|---|---|---|
| 4,063,221 | 12/1977 | Watson et al. | |
| 4,095,791 | 6/1978 | Smith et al. | 273/85 G |
| 4,196,316 | 4/1980 | McEowen et al. | |
| 4,259,668 | 3/1981 | Nishimura et al. | 340/711 |
| 4,278,844 | 7/1981 | Jones | |
| 4,322,581 | 3/1982 | Christian et al. | |
| 4,328,544 | 5/1982 | Baldwin et al. | |
| 4,361,877 | 11/1982 | Dyer et al. | |
| 4,377,852 | 3/1983 | Thompson | |
| 4,384,328 | 5/1983 | Watson et al. | 364/200 |
| 4,412,282 | 10/1983 | Holden | |
| 4,456,790 | 6/1984 | Soyack | 179/18 ES |

Primary Examiner—Raulfe B. Zache
Attorney, Agent, or Firm—John A. Caccuro

[57] ABSTRACT

A cartridge comprising circuitry and program instructions is added to a processor controlled telephone communication system to selectively change the operating system in accordance with the cartridge used.

15 Claims, 6 Drawing Figures

PROGRAMMABLE CARTRIDGE TELEPHONE COMMUNICATION SYSTEM

TECHNICAL FIELD

This invention relates to telephone communication systems in general and, in particular, to a telephone communication system including an interchangeable program memory cartridge for providing instructions for controlling the operation of the system.

BACKGROUND OF THE INVENTION

Modern electronic key telephone systems are typically marketed having a variety of systems sizes, station types, and feature combinations. Thus, the user can cost-effectively select the particular telephone system which best matches his needs in terms of system size (number of central office lines and number of station sets), type of station set utilized, and call feature capabilities. In some processor controlled key telephone systems, the operations of the system are controlled using preprogrammed read-only memories (ROMs) located on memory cards in a common control module.

A problem exists when a user decides to change system size, type of station set utilized, or features of his existing key telephone system. Typically, these system changes require the replacement of both hardware and memory circuit cards in the common control module. Undesirably, the replacement of the hardware and memory circuit cards often require the services of a skilled craftsperson to disassemble the common control module and make the desired changes to the system. What is desired is a simple, economic, and reliable arrangement to enable the user to make changes to the system without disassembling any part of the system.

SUMMARY OF THE INVENTION

In the present invention, a processor controlled key telephone communication system is arranged to accept a user interchangeable plug-in memory cartridge which supplements program instructions to the processor. The user interchangeable memory cartridge contains preprogrammed ROMs and user-programmable RAMs which enable, for example, the system size, type of station set utilized, and call features to be changed in an economical, simple, and reliable manner. In another aspect of the disclosed invention, the memory cartridge generates a control signal which causes the cartridge memory to supplement a section of the program memory in the system processor. Another feature of the invention provides additional user installable cartridges to provide optional features such as music-on-hold, paging, external alert and power fail transfer without the need to disassemble any part of the system.

BRIEF DESCRIPTION OF THE DRAWING

The detailed description of the invention will be more fully appreciated from the illustrative embodiment shown in the drawings, in which.

DETAILED DESCRIPTION

Figure 1:
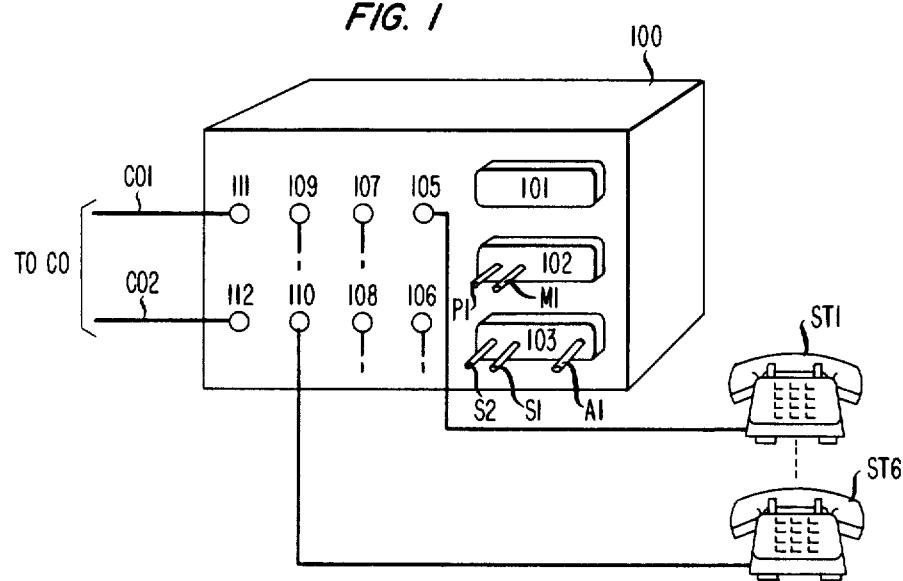
FIG. 1 is an illustration of the components of a communication system useful in describing the present invention.

FIG. 1 shows a preferred embodiment of a communication system of the present invention. The communication system of FIG. 1 accommodates up to six telephone lines connected to station sets, ST1-ST6, and two central office (CO) lines, CO1 and CO2, connected respectively, via lines and connectors 105-112 to common control module 100.

Common control module 100 includes internal memory and establishes and controls the intercom and central office line communications involving the station sets. Common control module 100 also may have three user accessible cartridge locations for inserting optional cartridges 101, 102 and 103 as shown in FIG. 1. User interchangeable programmed memory cartridge 101, for example, may be inserted in common control unit 100 to provide control for the operation of various optional system features. User interchangeable hardware cartridge 102 may provide the system with features such as a music-on-hold capability utilizing an externally provided music source connected to a terminal M1 and a system paging capability using terminal P1. User interchangeable hardware cartridge 103 could provide the system with both a power failure transfer and alert capability.

Figure 2:
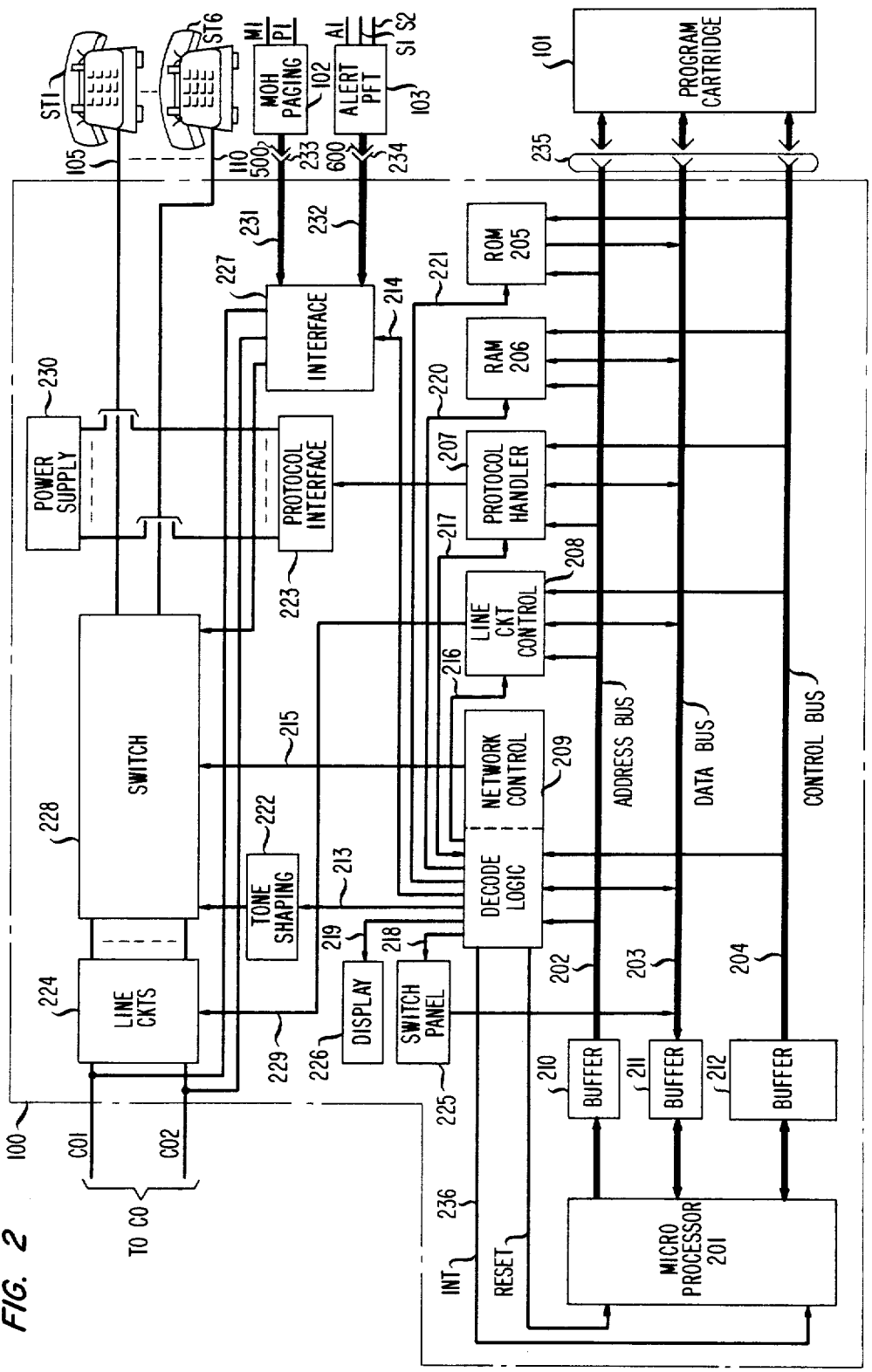
FIG. 2 is a schematic block diagram of the communication system illustrated in FIG. 1.

FIG. 2 shows a schematic block diagram of control module 100 which controls the communication system of FIG. 1. Power supply 230 provides power to all the station sets ST1-ST6 as well as to all the circuit blocks of FIG. 2. Control module 100 consists of microprocessor (CPU) 201 connected via address bus 202, data bus 203 and control bus 204 to program cartridge 101, read-only-memory (ROM) 205, random-access-memory (RAM) 206, protocol handler 207, line circuit controller 208 and decode logic and network controller (DLNC) 209. Communications between microprocessor (CPU) 201 and the address, data and control busses is accomplished through input/output (I/O) ports which are buffered, respectively, by buffers 210, 211 and 212. Program instructions from ROM 205 and/or program cartridge 101 control CPU 201 in a well known manner to perform the features and functions of the communication system. Additional memory, RAM 206, is utilized for storing and accessing user generated data associated with performing the desired function programmed in ROM 205.

In a preferred embodiment of control module 100, ROM 205 and RAM 206 provide, respectively, the program memory and temporary member required for performing the basic system communication functions. Additional or changed features and functions of the communication system are programmed in a user interchangeable program cartridge 101. Program cartridge 101 consists of additional ROM and RAM for storing program instructions and temporary data associated with these new features and functions. As will be described in a later paragraph, the connection of program cartridge 101 may replace all or part of ROM 205 to implement these new or changed features and/or functions in the communication system.

Microprocessor (CPU) 201 receives over busses 202-204 program instructions consisting of operation code and, if appropriate, an address field from ROM 205 and/or preprogrammed memory (program) cartridge 101. These program instructions enable CPU 201 to control communication connections between station sets ST1-ST6 and/or between a station set and central office lines CO1 and CO2. In response to the program instructions, CPU 201 performs the required memory reads, memory writes, decoding and other logical manipulation to the data and outputs control commands and data over busses 202-204 to various circuit modules (207-209).

One circuit module is Decode logic and network controller (DLNC) 209 which provides in a well-known manner various system timers, programmable tone generators, network control logic; and signals to select and control switch connections. Circuit DLNC 209 also generates a four level interrupt signal INT and sanity timer overflow signal RESET for CPU 201. Finally, DLNC 209 provides various decoding logic to generate address selects and control signals (213-217) for controlling the operation of other circuit modules.

In response to control signal 215 from DLNC 209, switch 228 operates to establish a voice connection between station sets ST1-ST6, and/or between any of the station sets and CO lines, CO1-CO2. Switch 228 may be implemented using standard well-known bipolar bilateral crosspoints. In a preferred embodiment, switch 228 may be constructed, and operate, as disclosed in the copending U.S. patent application Ser. No. 411,306, filed on Aug. 25, 1982 by R. H. Bidlack.

In response to signal 213 from DLNC 209, tone shaping circuitry 222 may use conventional circuits well known in the art to generate the required tones to be outputted to station sets ST1-ST6 during the operation of the various system features and functions.

In response to device control signal 216 from DLNC 209, line circuit controller (LCC) 208 decodes control signals from CPU 201 to enable the control of line circuits 224 via signal bus 229. Line circuits 224 provide the standard line circuit functions such as CO line ringing detection, CO line current sensing, CO line closure, multifrequency signaling and rotary outpulsing, transmission gain, and isolation of the switch network 228 from hostile potentials and/or longitudinal noise on the CO lines.

In response to control signal 217, protocol handler (PH) 207 performs I/O station set communication via protocol interface 223. The operation of PH 207 is controlled by CPU 201 via address bus 202, data bus 203 and control bus 204 in addition to control signal 217 from DLNC 209. Data to be transmitted to the connected station sets, ST1-ST6 is transferred by CPU 201 to a memory within PH 207. Similarly, data from the connected stations is read from PH 207 memory by CPU 201. Messages are regularly sent to each station under control of PH 207 during an operation called the "scan" function. The messages are formulated by PH 207 in the format required for communications between the station sets and common control module 100. Protocol interface 223 provides the actual interface between the protocol handler 207 and the telephone station lines 105-110.

Each station scan acts as a poll of that station which, in turn, responds with a message. Scan transmissions between PH 207 and each station proceed sequentially until all stations have been scanned, at which time the scan cycle is said to be completed. Data transfer between the CPU 201 and PH 207 occurs after a scan cycle is complete and prior to the beginning of a new scan cycle. Upon completion of a scan cycle, a scan complete signal is presented by PH 207 to DLNC 209. The DLNC then provides an interrupt signal INT to the CPU 201 via lead 236. Upon receipt of signal INT, microprocessor CPU 201 completes the data exchange with PH 207.

In response to control signal 214 from DLNC 209, interface 227 couples signals between the optional cartridges 102 and 103 and switch 228 over, respectively, busses 231 and 232. Thus, for example, when a line is placed on hold, control signal 214 permits the coupling of externally provided music to the held line. The music is received on lead M1 of cartridge 102 and is applied via connector 233 to bus 231, through interface 227 and switch 228 to the line placed on hold. Similarly, during a paging mode, a signal is coupled from the paging party's line through switch 228, interface 227 to lead P1 of cartridge 102.

In response to control signal 218 from DLNC 209, the contents of switch panel 225 are outputted to data bus 203. Switch panel 225 contains user inputted information on system options such as, for example, outpulsing or multifrequency tone signaling and outward dialing restrictions or station ringing preference. Control signal 219 from DLNC 209 enables light-emitting-diodes (LEDs) in display 226 to indicate the particular operating condition of the system.

FIG. 2 shows a user interchangeable program cartridge 101 connected to common control module 100. When the user desires an available new or improved system communication feature or capability, a different program cartridge 101 is plugged into common control module 100 to provide new system capability. The user interchangeability of the program cartridge 101 enables changes or additions in system capabilities to be made in an economical, simple and reliable manner without disassembly of any part of the system.

Figure 3:
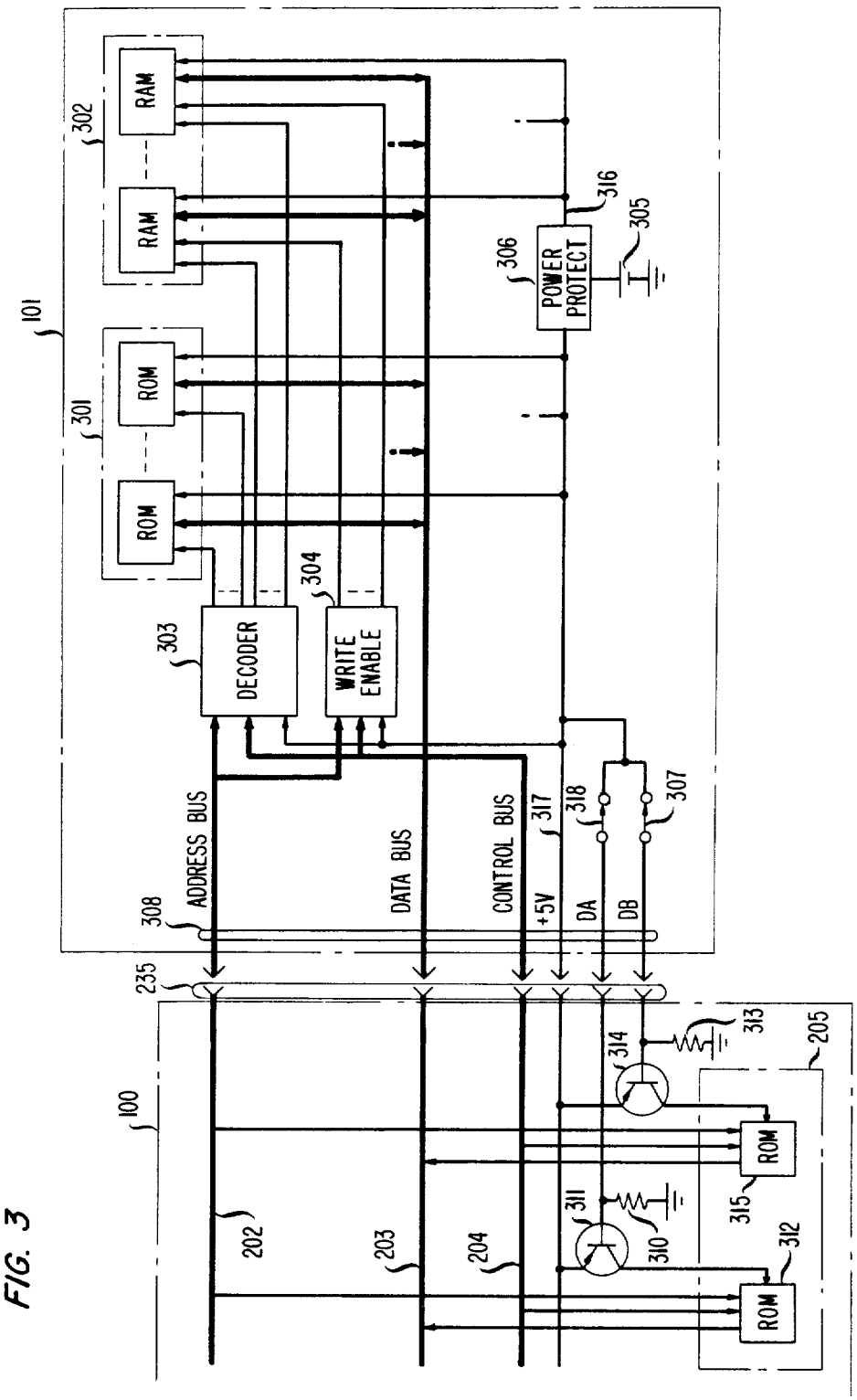
FIG. 3 is a schematic diagram of a memory cartridge and its connection to the common control module.

Program cartridge 101 may be constructed as an outer housing with an enclosed printed circuit board (not shown) containing the circuitry shown on FIG. 3. The printed circuit board edge 308 is arranged in a well-known manner to plug into a receptor means, connector 235, mounted on common control module 100. The leads in connector 235 include the address bus 202, data bus 203, control bus 204, dc power (+5 v) 317, leads DA and DB. Program cartridge 101 consists of two groups of standard memory devices identified as ROM bank 301 and RAM bank 302, which are selected for reading by decoder 303. RAM 302 can also be selectively written into using write enable circuit 304. Address bus 202 and control bus 204 connect to decoder 303 to provide access to ROM bank 301 and RAM bank 302. Data bus 203 connects to ROM bank 301 and RAM bank 302.

Power lead 317 provides dc power to ROM bank 301, RAM bank 302, decoder 303, and write enable circuit 304. Illustratively, the information in RAM bank 302 contains customer inputted information such as telephone assignment tables. To prevent the customer from having the tedious process of re-entering this information, the data in RAM bank 302 should be protected against inadvertent RAM write commands which can destroy the data in RAM. Typically these erroneous write commands occur during noise or software insanity conditions. In a preferred embodiment, write enable circuit 304 includes a RAM memory write protect circuit as described in the copending U.S. patent application Ser. No. 411,270, filed on Aug. 25, 1982 by V. J. Silverio, which description is incorporated by reference herein.

Since RAM bank 302 is a volatile memory which requires a constant source of power to prevent the loss of information in its memory, a rechargeable back-up battery 305 is provided. As will be described more completely in a later paragraph, rechargeable battery 305 provides a temporary source of power to RAM bank 302 via power protect circuit 306 and lead 316 during the time that a power interruption appears on lead 317 or when program cartridge 101 is disconnected from common control module 100.

With continued reference to FIG. 3, in a preferred embodiment of the common control module 100, ROM 205 may contain 48K words of memory. For illustrative purposes only, ROM 205 is shown in FIG. 3 as two ROMs, namely, ROM 312 and 315. When a program cartridge 101 is plugged into common control module 100 all or part of the ROM 205 memory is disabled and replaced by ROM 301 of program cartridge 101. Two disable circuits (including transistors 311 and 314) are responsive to signal leads DA and DB to control the connection of +5 volt power to ROM 312 and ROM 315, respectively. When switch 318 is connected to lead 317, a +5 volt disable signal is applied to lead DA. The +5 volt dc signal is applied across resistor 310 and biases transistor 311 to a non-conducting state. When transistor 311 is non-conducting it disconnects +5 volt dc power from ROM 312 of ROM arrangement 205. For example, ROM 312 may be a group of ROM devices which comprise 16K of a total of 48K of memory. Note, if switch 318 is not connected to +5 volts on lead 317 then transistor 311 is "on" and +5 volt power enables the operation of ROM 312. In such a condition ROM 301 of program cartridge 101 does not replace ROM 312.

Similarly, when switch 307 is connected to lead 317 a +5 volt disable signal is generated on lead DB. The +5 volt dc signal is applied across resistor 313 and biases transistor 314 to a non-conducting state. When transistor 314 is non-conducting it disconnects +5 volt dc power from ROM 315. In accordance with the previous example, ROM 315 may be a group of ROM devices which comprise the upper 32K of the 48K of memory of ROM arrangement 205. Thus, depending on the position of switches 307 and 318, program cartridge 101 replaces ROM 312 and/or ROM 315 of ROM arrangement 205 of common control module 100.

In accordance with the present invention, it is contemplated that mechanical means on the program cartridge 101 could also be used to operate a switch on common control module 100 to generate the disable signals for leads DA and DB. Moreover, it is further contemplated that a signal other than the +5 volt power could be used to enable ROMs 312 and 315. For example, disabling the connection of the read lead or data bus 203 to ROMs 312 and 315 would accomplish the desired result. The disclosed switching technique is independent of both the amount of ROM switched out of common control module 100 and the amount of ROM substituted therefor by program cartridge 101. The RAM located in common control module 100 can be supplemented by RAM located in program cartridge 101. The amount of ROM and/or RAM replaced or added to the system will depend on the amount of program instructions (ROM) and temporary memory (RAM) required to implement the features and/or functions provided by program cartridge 101.

In a preferred embodiment of the invention, sufficient ROM 205 and RAM 206 (FIG. 2) could be provided with the communication system to provide a basic telephone service capability. Thus, no program cartridge 101 is required with such a basic system. With no program cartridge 101 connected to common control module 100, both leads DA and DB are open and transistors 311 and 314 enable operation of ROM 312 and 315.

Since RAM bank 302 requires a constant source of power to prevent the loss of information in its memory, rechargeable battery back-up power is provided to power protect circuit 306 when the +5 v power is interrupted. However, rechargeable battery 305 must be protected against discharging below a predetermined level to prevent the battery from entering a deep-discharge state. If battery 305 voltage reaches the deep-discharge level, it cannot be recharged and would have to be replaced by disassembling cartridge 101 or replacing the cartridge. Since power protect circuit 306 provides circuitry for providing both battery back-up and battery protection, the need for either disassembling or replacing cartridge 101 is eliminated.

Figure 4:
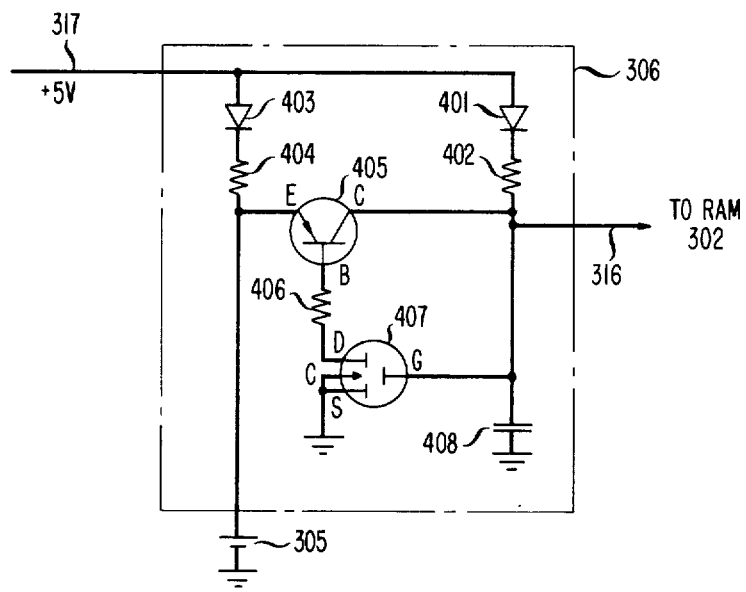
FIG. 4 is a schematic diagram of the battery protect module of the memory cartridge.

FIG. 4 shows a schematic of a power protect circuit 306 that may be included in program cartridge 101. When program cartridge 101 is connected to common control module 100, +5 volt power on lead 317 powers RAM bank 302 via diode 401 and resistor 402 and lead 316. Concurrently, current flow through diode 403 and resistor 404 charges rechargeable battery 305 (nicad battery or equivalent) until the voltage on battery 305 approaches a full charge (+5 V minus voltage drop in diode 403) at which time current ceases to flow through diode 403 and resistor 404. During the time when +5 V is present on lead 317, the voltage on lead 316 is approximately 4.8 volts. The voltage on lead 316 also appears across capacitor 408 and gate G of field-effect transistor (FET) 407. Since the voltage on gate G is greater than +1.5 to +3.0 volts, FET 407 conducts permitting current flow between drain D and source S. Thus, current flows from the emitter-base junction of transistor 405 through resistor 406 through drain D and source S to ground. Transistor 405 is turned on permitting current flow from emitter E to collector C to lead 316. When the +5 volt dc power on lead 317 is interrupted or when program cartridge is disconnected from common control module 100, no current flows through diode 401 and diode 403. RAM bank 302, however, is supplied current from battery 305 through the emitter-collector path of transistor 405. As battery 305 supplies current it slowly discharges reducing its output voltage. If the voltage across battery 305 were permitted to drop below a predetermined value, battery 305 would not be rechargeable when +5 volt dc power was reconnected to lead 317. The damage resulting from such a condition is permanent and would require the replacement of battery 305. To prevent such a deep-discharge condition, FET 407 turns off when the voltage at gate G falls below the +1.5 to +3.0 volt level. When FET 407 turns off, transistor 405 also turns off and no current is allowed to flow to RAM bank 302. At this point battery 305 is disconnected from RAM bank 302 and is hence protected from reaching a deep-discharge condition. Obviously, the volatile memory contents of RAM bank 302 are lost when the dc voltage is removed. When the +5 volt dc power is reapplied to lead 317, battery 305 is recharged through diode 403 and resistor 404. The content of RAM bank 302, however, would then have to be re-entered.

Figure 5:
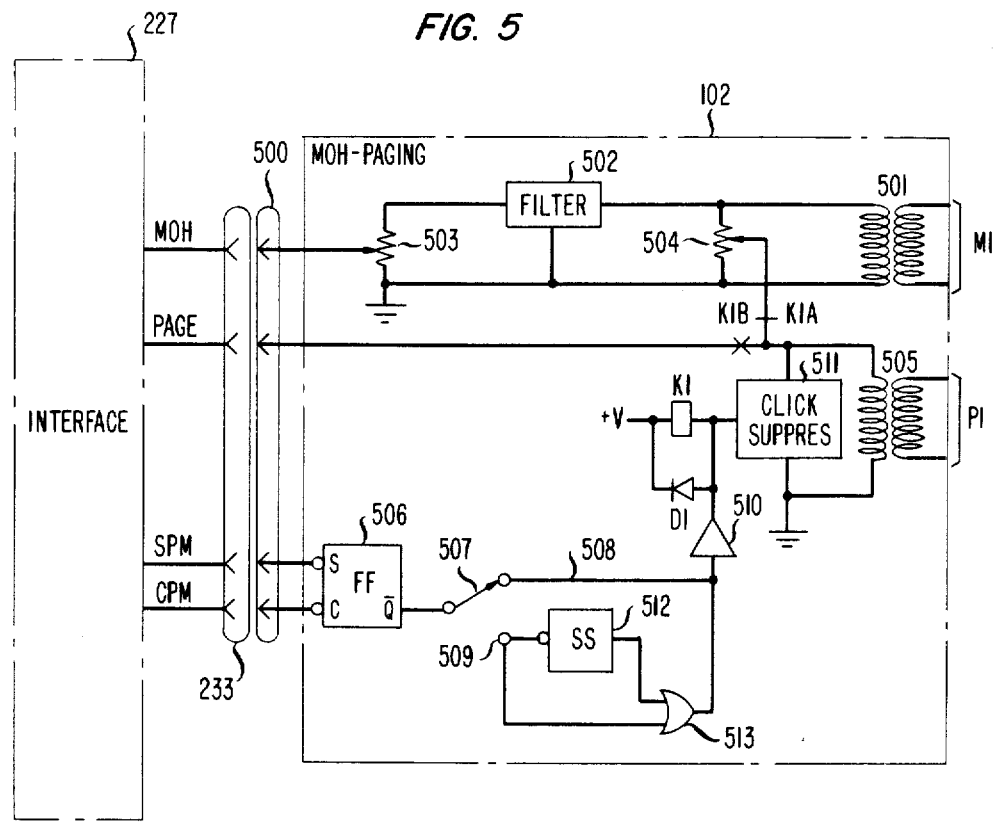
FIG. 5 is a schematic diagram of a cartridge which provides music-on-hold and paging capability.

FIG. 5 shows a schematic of an optional music-on-hold/paging cartridge 102. Cartridge 102 is a user interchangeable hardware cartridge which controls the connection of external music-on-hold and paging circuitry to the system. Cartridge 102 includes an outer housing with a mounted circuit board (not shown) containing the circuitry of FIG. 5. An edge of the printed circuit board 500 plugs into a cartridge receptor, connector 233, of the interface 227. When a station or line is placed on hold, music received from the customer's music source M1 is coupled through isolation transformer 501, a well-known overvoltage protection and high frequency filter circuit 502, and music-on-hold volume control 503 to the MOH lead of interface 227. This music is distributed to the held line via switch 228 of common control module 100. Additionally, when the paging mode is not activated, music is provided as background music over the paging leads P1 via background music volume control 504, break contact K1A and transformer 505.

The paging mode is initiated when flip-flop 506 is set in response to a set paging mode signal (SPM) from interface 227. During the paging mode, the output of flip-flop 506 is at a ground potential. Switch 507 has a tone signaling position 508 and a no tone signaling position 509. In the paging mode when switch 507 is set to position 508, the ground on output Q is connected to buffer amplifier 510 which operates relay K1 and well-known click suppression circuit 511. Click suppression circuit 511 prevents audible clicks from being outputted to paging leads P1. Diode D1 connects across relay K1 between +V and the output of amplifier 511 to provide surge protection to amplifier 510.

When relay K1 operates, make contact K1B closes and break contact K1A opens. Thus, music provided via lead M1 is interrupted and a page signal from lead PAGE of interface 227 is outputted via transformer 505 over page lines P1. A tone signal precedes every voice paging signal received over lead PAGE. When switch 507 is in the tone position 508, relay K1 is immediately operated and a tone signal on lead PAGE is outputted to the paging system, not shown, via leads P1.

When no tone signaling prior to voice paging is required, switch 507 is set to the no tone position 509. In the no tone position single shot 512 and OR gate 513 are connected to output lead $\overline{Q}$ of flip-flop 506. Single shot 512 is designed to provide a logic 1 output for a predetermined time (T seconds) in response to a ground input received from output lead $\overline{Q}$. The output of single shot 512 connects to one input of the two input OR gate 513, causing a logic 1 out of OR gate 513 for about T seconds. The logic 1 output of OR gate 513 connects to amplifier 510 and prevents the operation of relay K1 for approximately T seconds. With relay K1 not operated, make contact K1B remains open and hence the tone signal which occurs during the first T seconds of the paging mode is prevented from reaching transformer 505 and page leads P1.

After T seconds, both inputs to OR gate 513 are at logic 0, ground potential, causing amplifier 510 to operate relay K1. Thus, T seconds after the page mode is established, make contact K1B closes permitting voice signal to be coupled to page leads P1.

Figure 6:
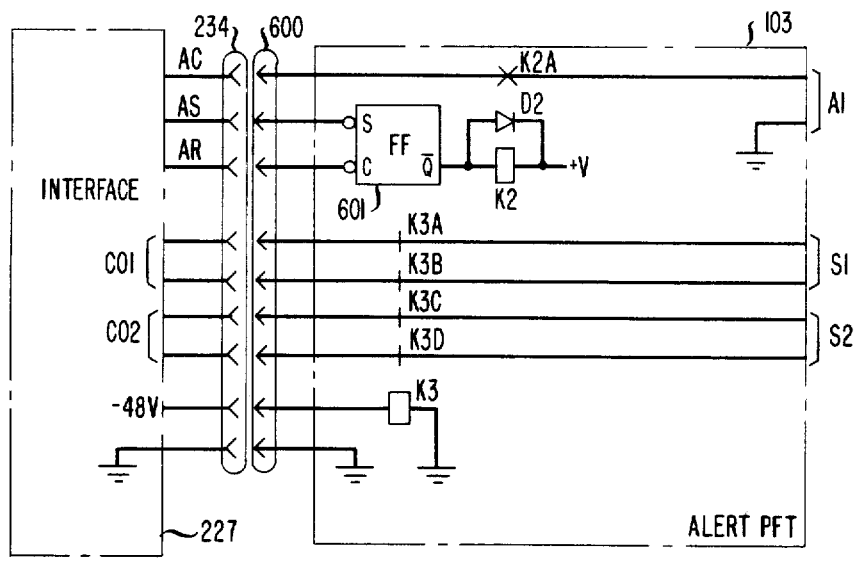
FIG. 6 is a schematic diagram of a cartridge which provides a power failure transfer and external alert capability.

FIG. 6 shows a schematic of an optional extra alert and power failure transfer cartridge 103. Cartridge 103 is a user interchangeable cartridge which controls the connection of the extra alert and power failure transfer circuitry to the system. Cartridge 103 includes an outer housing with a mounted printed circuit board (not shown) containing the circuitry of FIG. 6. An edge of the printed circuit board 600 plugs into a cartridge receptor, connector 234, of control module 100.

In the event of a predetermined alert condition, an alert set AS, a signal is generated in interface 227 which sets flip flop 601. The operation of flip flop 601 causes output $\overline{Q}$ to ground causing relay K2 to operate. Diode D2 protects flip flop 601 from voltage transients produced by relay K2. When relay K2 operates, make contact K2A closes and provides −48 v dc from interface 227 across leads A1 signifying an alert condition to the customer. When the alert is cleared a reset signal AR from interface 227 clears flip flop 601 removing the −48 vdc voltage from across leads A1. Additionally, in the event of a failure of the commercial AC power, −48 volts which is normally present from interface 227 via connector 234 is lost causing relay K3 to release. When relay K3 releases, break contacts K3A and K3B connect a standard station set (not shown) via telephone pair S1 and interface 227, to central office line CO1. Similarly, break contacts K3C and K3D connect another standard station set (not shown) via telephone pair S2 and interface 227 to central office line CO2.

Since during a commercial AC voltage failure common control 100 and station sets ST1–ST6 would not have the required power to properly operate, limited telephone service is provided by standard telephone sets which are connected over leads S1 and S2 to operate from the −48 volts provided via central office lines CO1 and CO2.

What has been disclosed is merely illustrative of the present invention. Other circuits and embodiments can be implemented by those skilled in the art without departing from the spirit and scope of the present invention.

What is claimed is:

1. A control module for connecting to a plurality of communication lines comprising:
   a processor including memory means for controlling communications between said communication lines wherein
   said memory means includes two or more memory sections each section being separately controlled by an enable signal,
   cartridge receptor means connected to said processor to supplement the memory in said processor whenever a cartridge is inserted and
   means responsive to the connection of a cartridge to said cartridge receptor means for disabling an enable signal to a first memory section.

2. The control module of claim 1 wherein
   said enable signal of each section of said memory means supplies power to that section and
   said disabling means includes
   means responsive to a disable signal from a connected cartridge for disconnecting said power from said first memory section.

3. The control module of claim 2 further comprises means for powering a connected cartridge through said cartridge receptor means.

4. The control module of claim 1 further comprising second cartridge receptor means connected to said control module to output a control signal and connect to an external communication path whenever a second cartridge is inserted therein.

5. A control module for connecting to a plurality of communication lines comprising:
a processor including memory means for controlling communications between said communication lines wherein
said memory means includes two or more memory sections each section being separately controlled by an enable signal,
a program cartridge connected to said processor to supplement the memory in said processor and
means responsive to the connection of a cartridge to said cartridge receptor means for disabling an enable signal to a first memory section.

6. The control module of claim 5 wherein
said enable signal of each section of said memory means supplied power to that section and
said disabling means includes
means responsive to a disable signal from a connected cartridge for disconnecting said power from said first memory section.

7. The control module of claim 5 further comprises means for powering a connected cartridge through said cartridge receptor means
wherein said program cartridge includes
a power consuming volatile memory device;
a battery; and
means connected to said battery, the power terminals of said memory device, and said powering means for connecting said powering means to said memory device and disconnecting said battery from said memory device when the voltage of said powering means exceeds a predetermined voltage, and connecting power from said battery to said memory device and disconnecting said powering means from said memory device when the voltage of said powering means does not exceed said predetermined voltage.

8. The control module of claim 5 further comprising means for generating a control signal, and
a cartridge connected to said control module and responsive to said control signal from said control module for connecting an external communication path to said control module.

9. The control module of claim 8 wherein said external communication path carries an audible signal.

10. The control module of claim 8 wherein said control module includes a connection to a central office line and wherein said cartridge is responsive to said control signal for connecting said external communication path to said central office line.

11. A memory cartridge for connecting to a control module which connects to a plurality of communication lines, said control module operable under program instructions from a connected memory for controlling communications between said connected communication lines, the connection of said memory to said control module being controlled by a disable signal, said memory cartridge comprising
memory means and
means for generating a first memory disable signal.

12. The memory cartridge of claim 11 further including
power receiving means;
a power consuming volatile memory device;
a battery; and
means connected to said battery, the power terminal of said memory device, and said power receiving means for connecting said power receiving means to said memory device and disconnecting said battery from said memory device when the voltage at said power receiving means exceeds a predetermined voltage, and disconnecting said power receiving means from said memory device and connecting said battery to said memory device when the voltage at said power receiving means does not exceed said predetermined voltage.

13. The preprogrammed memory cartridge of claim 11 further including
means for generating a second system memory disable signal, and
means for switching either said first or second system memory disable signal to said system.

14. A method of operating a communication system including a processor, a memory, a program cartridge receptor means, and a plurality of communication lines, the method comprising the steps of:
controlling communications between said lines from program instructions in said memory, wherein said memory means includes two or more memory sections each section being separately controlled by an enable signal and
changing the communication capability of the system by disabling an enable signal to a first memory whenever a cartridge is connected to the cartridge receptor means.

15. A method of operating a communication system including a processor, a memory, a program cartridge, and a plurality of communication lines, the method comprising the steps of:
controlling communications between said lines from program instructions in said memory when said program cartridge is not connected to said system, wherein said memory means includes two or more memory sections each section being separately controlled by an enable signal and
controlling some communications between said lines from program instructions on said program cartridge by disabling an enable signal to a first memory when said program cartridge is connected to said system.

* * * * *